May 23, 1950    H. W. CARDWELL ET AL    2,508,564
AIR CONTROLLED SHIFTING MECHANISM

Filed July 30, 1947      2 Sheets-Sheet 1

Inventors
Harland W. Cardwell
and James W. Haupt
By Bacon + Thomas
Attorneys

May 23, 1950  H. W. CARDWELL ET AL  2,508,564
AIR CONTROLLED SHIFTING MECHANISM
Filed July 30, 1947  2 Sheets-Sheet 2
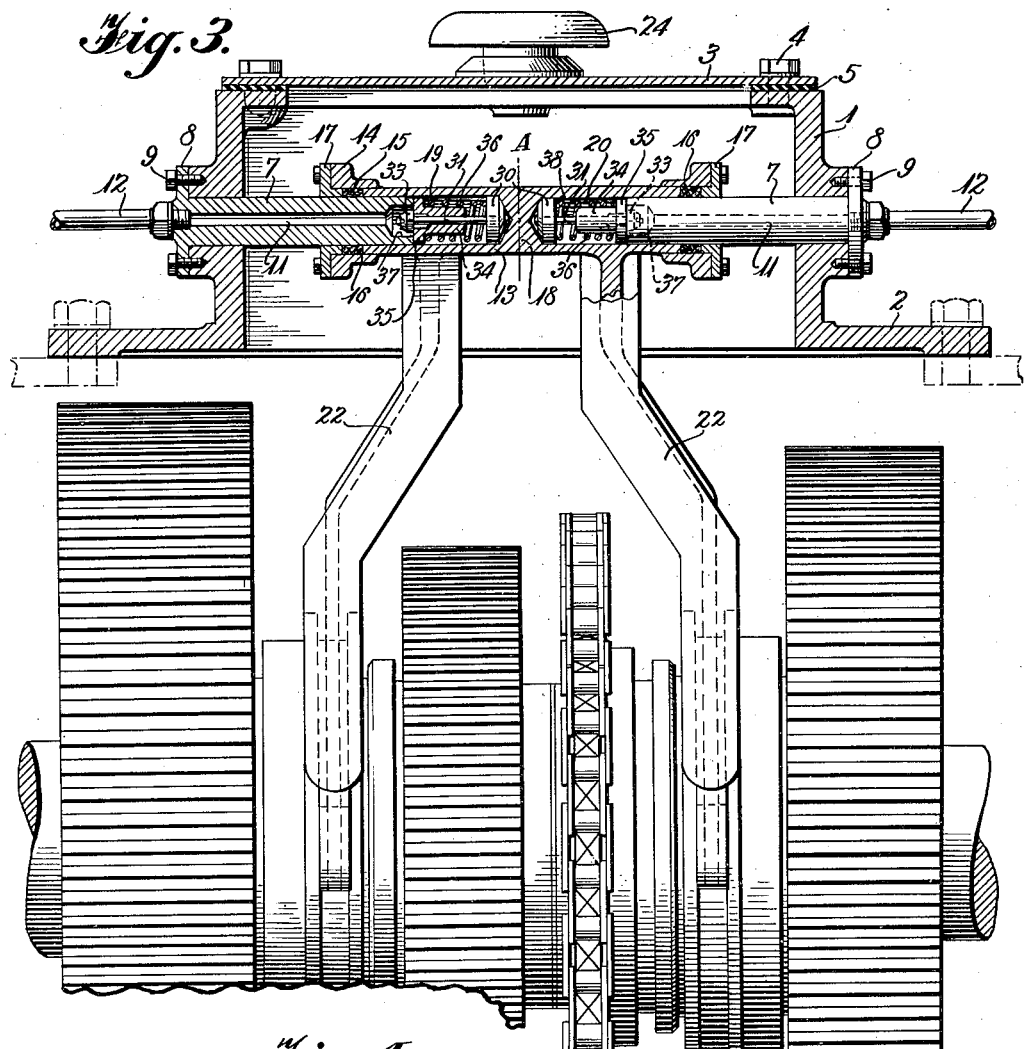
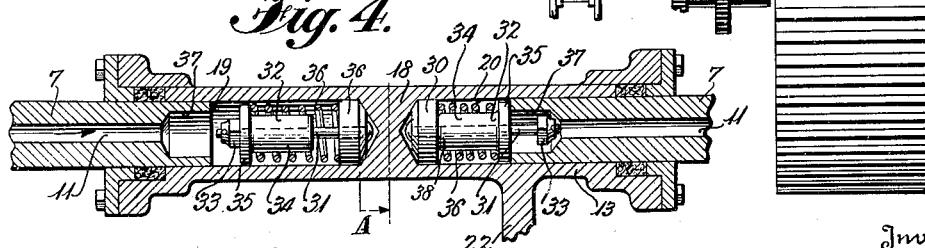
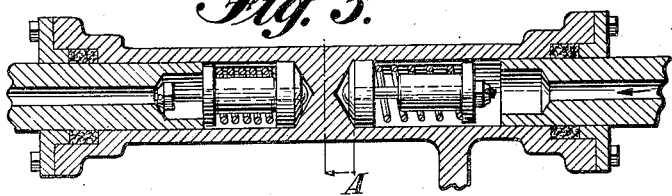
Inventors
Harland W. Cardwell
and James W. Haupt
By Bacon & Thomas
Attorneys Patented May 23, 1950

2,508,564

UNITED STATES PATENT OFFICE 2,508,564

AIR CONTROLLED SHIFTING MECHANISM

Harland W. Cardwell and James W. Haupt, Wichita, Kans., assignors to Cardwell Manufacturing Company, Inc., Wichita, Kans.

Application July 30, 1947, Serial No. 764,836

4 Claims. (Cl. 74—364)

This invention relates to gear shifting mechanisms wherein the ratio of drive from a source of power to a driven member may be varied at the will of the operator.

It is an object of this invention to provide such a gear shifting mechanism that can be operated by a fluid under pressure, preferably air, from a remote control station.

It is a further object of this invention to provide a gear shifting mechanism that is simple and economical in construction and providing for maximum efficiency and dependability in operation.

It is a further object of this invention to provide such a gear shifting mechanism that may be readily attached to a standard selective gear drive to replace the conventional manual or other shifting mechanism.

It is a still further object of this invention to provide such a gear shifting mechanism wherein the fluid under pressure will actuate means to effect the desired gear ratio and wherein continued application of the fluid pressure will not cause undue wear of the operated parts.

In the accompanying drawings there are illustrated preferred embodiments of this invention, and in which:

Figure 3 is a vertical sectional view similar to Figure 2 but illustrating a modified embodiment;

Figures 4 and 5 are detailed sectional views on an enlarged scale showing certain parts of the embodiment of Figure 3 in opposite extreme positions.

Figure 1:
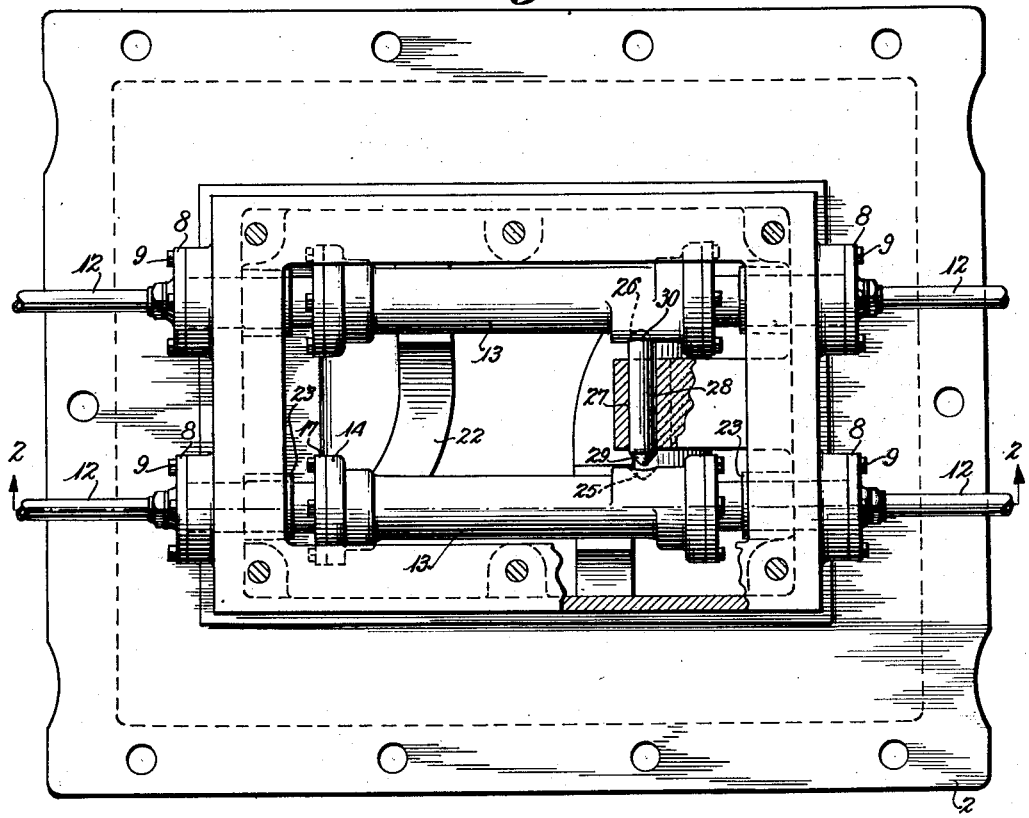
Figure 1 is a top plan view of one embodiment of the gear shifting mechanism with the cover plate removed.
Figure 2:
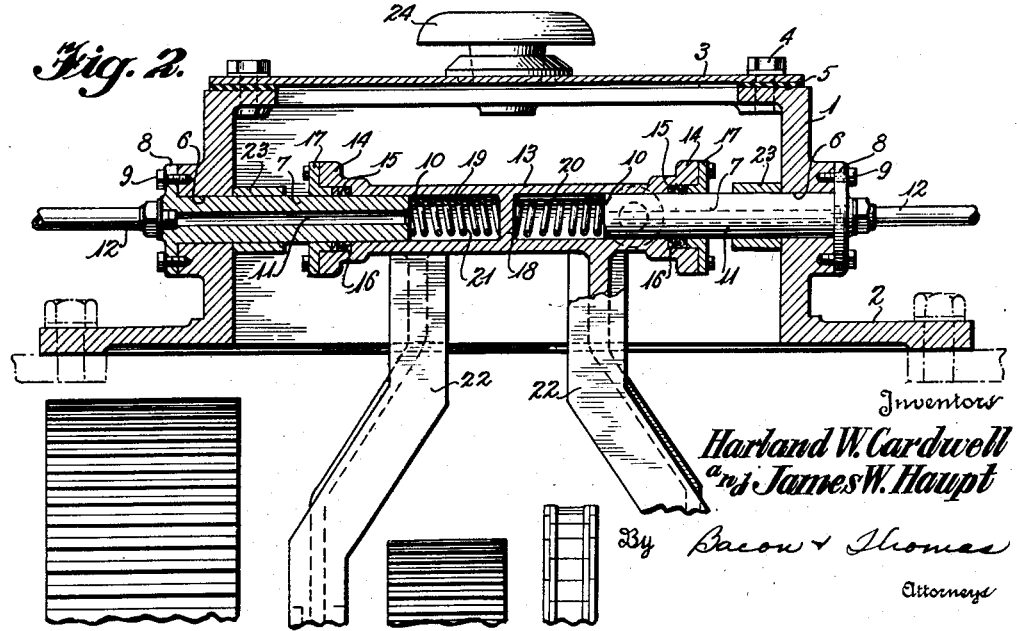
Figure 2 is a longitudinal vertical sectional view taken along the line 2—2 of Figure 1 looking in the direction of the arrows.

In the embodiment shown in Figures 1 and 2, a housing member 1 has a flanged portion 2 whereby it may be attached to a conventional transmission housing by means of cap screws, or the like. The housing 1 is open at its top and bottom portions, the opening in the bottom thereof communicating with the interior of the transmission housing and the top opening being provided with a cover plate 3 attached thereto by such means as cap screws 4 or the like. If desired, the cover plate 3 may be provided with a gasket as shown at 5.

The housing 1 is provided at opposite ends with opposed pairs of openings 6. In the opposed openings of each pair, a pair of axially aligned guide rods 7 are mounted, each guide rod having a head portion 8 by which it is held in assembled relation with the housing member 1 by cap screws 9 or the like. The adjacent ends 10 of the aligned guide rods are axially spaced apart a substantial distance as clearly shown in Figure 2. Each guide rod also is provided with an axial bore 11 and a fitting 12 for a purpose to be later described.

A tubular shifting member 13 is telescopically arranged over the adjacent ends of opposed rods 7 for sliding movement thereon. Each tubular member 13 is provided with an enlarged portion 14 at each end thereof and an enlarged bore 15 in said enlarged portion. Each of said enlarged bores 15 contains a packing material 16 held therein by a packing ring 17. The purpose of the packing 16 is to effect a seal between the tubular members 13 and the guide rod 7 sufficient to retain the necessary fluid pressure within the tubular member. The packing 16 may be of any conventional or suitable type. Each tubular shifter member 13 is further provided with a partition wall 18 substantially midway of its length and said partition wall is between the opposed ends of the aligned guide rods 7, thus providing a pair of expansible pressure chambers 19 and 20 within said tubular shifter member. A compression spring 21 is located in each pressure chamber and each abuts at one end against the end of one of the guide rods 7 and at its other end against the partition wall 18. Each tubular shifter member 13 is further provided with a shifter fork 22. As shown, each shifter fork is integral with its tubular shifter member 13 but it is to be understood that such construction is not necessary for the practice of this invention since the shifter forks 22 may be constructed separately and attached to the tubular members 13 in any convenient or suitable manner. The shifter forks 22 engage movable members in the transmission mechanism whereby to move said members in either direction to effect a change in gear ratio, all as is well known in the art.

Each of the aligned guide rods 7 is further provided with a stop collar 23 between the ends of the tubular shifter member and the housing member 1.

The cover plate is provided with a suitable vent or breather cap 24 whereby the interior of the shifter mechanism and transmission housing is in communication with the outer atmosphere. Such a vent is provided to equalize the pressure within the housing and the outer atmosphere so that in the event the shifter mechanism should leak and allow fluid under pressure to enter the transmission casing, such pressure will be dissipated through the vent 24 to guard against its forcing lubricating oil from the working parts of the transmission mechanism.

Each of the fittings 12 is connected, through a suitable control valve mechanism (not shown) to a source of fluid pressure whereby fluid under pressure may be selectively admitted to the shifter mechanism through any one of the fittings 12.

Upon admission of fluid under pressure to any one of the fittings, for instance, that shown at the right in Figure 2, such fluid under pressure will be conducted through the axial bore 11 into the expansible chamber 20 and will force the tubular shifter member 13 to the left against the action of the left-hand spring 21 until the packing ring 17 on the left side abuts and is stopped by the stop collar 23, thus moving its shifter fork 22 and the associated gear mechanism to effect engagement of the selected gears. The stop collar 23 thus absorbs any continued thrust due to the fluid pressure in the chamber 20 and prevents such thrust from being transmitted to the rotating parts of the gear mechanism, through the fork 22, thus preventing undue wear of said parts. Upon release of the pressure from the chamber 20 the spring 21 in the left-hand chamber will expand to return the shifter member 13, fork 22 and the gear mechanism to neutral position, that is, the position shown in Figure 2. In the embodiment just described it is necessary that the springs 21 be of equal strength since the neutral position of the shifter member 13 is that position at which the forces of the opposed springs just balance each other. The springs must be so balanced that the gear mechanism controlled thereby is held normally in its neutral or disengaged position.

As shown in Figure 1, adjacent ends of the two tubular shifter members 13 are provided with opposed conical recesses 25 and 26. Said recesses are opposite each other when the tubular members 13 are in their mid or neutral position as shown. A portion of the housing 1 is provided with a bore 27 in which a pin 28 is slidably mounted. The pin 28 is provided with conical ends 29 and 30 and is of such length that when one end is received in one of the recesses 25 or 26, its opposite end just clears the side of the other tubular member 13. Thus, if the tubular member 13 shown at the top of Figure 1 were shifted either to the right or left, the conical sides of the recess 26 would force the pin 28 downwardly and into the recess 25 thus locking the lower tubular member 13 in its neutral position until such time as the upper tubular member 13 is returned to its mid or neutral position.

The embodiment of the invention shown in Figures 3 to 5 comprises a housing 1, flange 2, cover plate 3, and axially aligned guide rods 7 identical to those described in connection with Figures 1 and 2. All other parts of the embodiment of Figures 3 to 5 bearing the same reference numerals as corresponding parts in Figures 1 and 2 are identical therewith and need not be further described. This embodiment differs from that in Figures 1 and 2 in that means are provided for positively determining the neutral or mid position of the tubular shifter members 13 irrespective of the relative strength of the springs employed.

In each of the expansible pressure chambers 19 and 20 a plug member 30 is positioned adjacent the partition wall 18. Each of the plug members 30 has rigidly attached thereto a guide member 31 on which a slide 32 is mounted for sliding movement into engagement with a stop nut 33 threaded on the free end of each of the guides 31. The nuts 33 are preferably castellated nuts and are locked in adjusted position by means of cotter pins. Each of the slide members 32 consists of a cylindrical portion 34 and a flanged portion 35 and a compression spring 36 is located between and reacts against the flange 35 and the plug 30.

Each of the aligned guide rods 7 is provided with an enlarged bore 37 adjacent its free end, said bore being of sufficient diameter to accommodate the stop nut 33, as clearly shown in the drawings. The line A in Figures 3, 4 and 5 represents the mid position of the mechanism and when the mid point of the tubular members 13 lies on line A the controlled gear mechanisms are in neutral. As shown in Figure 3, the tubular member 13 is in such neutral position and it is to be noted that the flange members 35 are in abutment with the stop nuts 33 and also engage the ends of the aligned guide rods 7, thus it will be seen that the tubular member 13 is positioned and maintained in such neutral position irrespective of the relative strength of the springs 36 since any excessive force exerted by the stronger of the two springs is absorbed by the stop nut 33 and does not react against the end of the guide rod 7 to move the tubular shifter member 13 from its neutral position.

If fluid under pressure is admitted to one of the expansible chambers, for instance, the left hand chamber 19, that chamber will be expanded and the tubular shifter member 13 will be moved to the right and the parts will assume the position shown in Figure 4. It will be noted from Figure 4 that when pressure is admitted to the left hand chamber 19 the spring in the right hand chamber will be compressed until the end 38 of the cylindrical portion 34 engages the plug 30 and since the flange 35 is in engagement with the end of the right hand guide rod 7, the shifter mechanism cannot move any further toward the right. Thus, a positive stop is provided to limit the movement of the fork 22 and its controlled gear mechanism. The parts are so proportioned that the controlled gear member will be moved a sufficient amount to properly engage with its associated transmission element but will not be urged beyond that point. During movement of the parts toward the right as shown in Figure 4, the spring and stop mechanism located in the left-hand chamber 19 will be ineffective and merely move with the shifter member 13 to the right away from the adjacent end of the left-hand guide rod 7.

Upon release of the fluid pressure from the chamber 19, the compressed spring 36 in the chamber 20 will move the tubular shifter member 13, its fork 22, and the controlled gear part to the left. The plug member 30, guide 31, and stop nut 33 (in chamber 20) will also move to the left with the member 13, leaving the flange 35 in abutment with the end of the guide rod 7. Such movement to the left will continue until the stop nut 33 engages the outer face of the flange 35 and renders the spring 36 ineffective to move the parts farther. At the same time, the flange 35 in the left-hand chamber 19 will just reach the end of the left-hand guide rod 7 and the shifter mechanism will be in its mid or neutral position.

When the fluid under pressure is admitted to the right-hand chamber 20, the parts will assume the position shown in Figure 5 with the spring and stop elements in the left-hand chamber functioning exactly as did those in the right-hand chamber when the fluid under pressure was admitted to the chamber 19.

Although the embodiments of Figures 1 and 3 each show an integral partition wall in the tubular member 13 as dividing the two expansible pressure chambers, it is to be understood that any other suitable means could be provided with equal facility. For instance, the partition wall could be a separate element inserted after the member 13 has been bored. Furthermore, in the embodiment of Figures 3 to 5 the partition wall 18 could be eliminated and the plug members 30 engaging a suitable stop could provide the necessary pressure seal between the chambers. Likewise the parts 34 and 35 of the slides 32 need not be integral, they could be made as separate elements or the part 34 could be integral with the plug 30.

Although the preferred actuating fluid for the gear shifting mechanism of this invention is compressed air, clearly any other suitable pressure transmitting fluid could be employed with equal facility and it is not intended that this invention be limited to the use of compressed air.

While two specific embodiments of the invention have been described, they are intended to be merely illustrative and not to limit the scope of the invention. It is contemplated that all embodiments falling within the scope of the appended claims be considered as included in the present invention.

We claim:

1. A gear shifting mechanism comprising: a support; a pair of axially aligned rods carried by said support and having their adjacent ends axially spaced; a tubular shifter member telescopically slidable over the adjacent ends of said rods; means in said tubular member, between the ends of said rods, providing a fluid pressure seal therein whereby to divide the space between said rod ends into a pair of expansible pressure chambers; a longitudinally slidable member in each of said chambers, stop means to limit the range of sliding movement of each of said slidable members; a compression spring between each slidable member and said sealing means; and means for selectively introducing fluid under pressure to either of said chambers.

2. A gear shifting mechanism comprising: a support; a pair of axially aligned rods carried by said support and having their adjacent ends axially spaced; a tubular shifter member telescopically slidable over the adjacent ends of said rods; a partition wall in said tubular member between the ends of said rods and forming, with said rod ends and tubular member, a pair of expansible chambers; a plug in each of said chambers adjacent said partition wall, each said plug supporting an axially extending guide having stop means at its end opposite said plug; a slide on said guide having a portion providing an annular shoulder facing said plug and a portion extending toward said plug to limit the minimum spacing between said plug and said shoulder; a compression spring reacting against said plug and said shoulder and urging said slide into engagement with said stop means and the end of the adjacent rod, the said parts being so proportioned that the distance between the outer ends of said slides, when in engagement with said stops is substantially equal to the distance between the ends of said rods; and means for selectively admitting fluid under pressure to either of said chambers.

3. A gear shifting mechanism comprising: a support; a pair of axially aligned rods carried by said support and having their adjacent ends axially spaced; a tubular shifter member telescopically slidable over the adjacent ends of said rods; a partition wall in said tubular member between the ends of said rods and forming, with said rod ends and tubular member, a pair of expansible chambers; a plug in each of said chambers adjacent said partition wall, each said plug supporting an axially extending guide having stop means at its end opposite said plug; a slide on said guide having a portion providing an annular shoulder facing said plug and a portion extending toward said plug to limit the minimum spacing between said plug and said shoulder; a compression spring reacting against said plug and said shoulder and urging said slide into engagement with said stop means and the end of the adjacent rod, the said parts being so proportioned that the distance between the outer ends of said slides, when in engagement with said stops, is substantially equal to the distance between the ends of said rods; a recess in the end of each of said rods to accommodate said stop means when said slides are in engagement with said rod ends; and axial bores in said rods, communicating with said recesses and a source of fluid pressure whereby fluid under pressure may be selectively admitted to either of said chambers to effect sliding movement of said tubular shifter member in one direction.

4. A gear shifting mechanism comprising: a support; two pairs of axially aligned rods carried by said support and having their adjacent ends axially spaced; a tubular shifter member telescopically slidable over the adjacent ends of each pair of rods; fluid pressure means acting within said tubular members to selectively slide either tubular member in either direction from a mid position; stop means for limiting the movement of each tubular member in each direction; expansible spring means normally urging said tubular members toward said mid position, adjustable stop means to limit the range of action of said spring means and thereby vary said mid position; a conical recess in the external surface of each tubular member, said recesses facing each other when said tubular members are in their mid position; a locking member carried by said support and movable into either recess at the mid position of said tubular members, and means for moving said locking member into the recess in one tubular member when the other tubular member is moved from its mid position whereby to lock said one tubular member in its mid position until said other tubular member returns to its mid position.

HARLAND W. CARDWELL.
JAMES W. HAUPT.

REFERENCES CITED

The following references are of record in the file of this patent:

UNITED STATES PATENTS

| Number | Name | Date |
|---|---|---|
| 68,994 | King | Sept. 17, 1867 |
| 859,737 | Brown | July 9, 1907 |
| 1,010,054 | Irish | Nov. 28, 1911 |
| 1,141,589 | Taylor | June 1, 1915 |
| 2,110,994 | Linsley | Mar. 15, 1938 |
| 2,242,542 | Peterson | May 20, 1941 |
| 2,403,328 | Banning | July 2, 1946 |

FOREIGN PATENTS

| Number | Country | Date |
|---|---|---|
| 1,193 | Great Britain | 1868 |
| 800,878 | France | July 21, 1936 |